(12) United States Patent
Baetens et al.

(10) Patent No.: US 11,869,243 B2
(45) Date of Patent: Jan. 9, 2024

(54) METHOD AND SYSTEM FOR DETECTING HEATING

(71) Applicant: Araani NV, Kortrijk (BE)

(72) Inventors: Maggy Baetens, Kortrijk (BE); Maarten Callens, Kortrijk (BE); Tom Verdonck, Kortrijk (BE)

(73) Assignee: Araani NV, Kortrijk (BE)

( * ) Notice: Subject to any disclaimer, the term of this patent is extended or adjusted under 35 U.S.C. 154(b) by 10 days.

(21) Appl. No.: 17/059,680

(22) PCT Filed: May 31, 2019

(86) PCT No.: PCT/EP2019/064234
§ 371 (c)(1),
(2) Date: Nov. 30, 2020

(87) PCT Pub. No.: WO2019/229261
PCT Pub. Date: Dec. 5, 2019

(65) Prior Publication Data
US 2021/0209376 A1 Jul. 8, 2021

(30) Foreign Application Priority Data

May 30, 2018 (EP) .................................. 18175046

(51) Int. Cl.
*G06V 20/52* (2022.01)
*G01N 25/20* (2006.01)
*G01K 17/00* (2006.01)

(52) U.S. Cl.
CPC ............. *G06V 20/52* (2022.01); *G01K 17/00* (2013.01); *G01N 25/20* (2013.01); *G06V 2201/06* (2022.01)

(58) Field of Classification Search
CPC .... G06V 20/52; G06V 2201/06; G01K 17/00; G01N 25/20
See application file for complete search history.

(56) References Cited

U.S. PATENT DOCUMENTS 5,133,605 A * 7/1992 Nakamura ........... G08B 13/194
374/129
2004/0254472 A1 * 12/2004 McQuilkin ............ A61B 5/015
600/549

(Continued)

FOREIGN PATENT DOCUMENTS

WO 2018020021 A1 2/2018

OTHER PUBLICATIONS

International Search Report dated Sep. 4, 2019, in reference to co-pending European Application No. PCT/EP2019/064234 filed May 31, 2019.

(Continued)

*Primary Examiner* — Kenny A Cese
(74) *Attorney, Agent, or Firm* — Dinsmore & Shohl LLP

(57) ABSTRACT

The invention relates to a method for detecting the heating activity in objects or materials, based on thermal only or thermal and visual data images. The method is based on a physics-based model of the underlying heating phenomena within materials or objects, while taking into account disturbing factors of natural phenomena such as weather conditions and day and night cycle. The invention also relates to a corresponding system for detecting the heating activity in objects or materials.

12 Claims, 16 Drawing Sheets

(56) References Cited

U.S. PATENT DOCUMENTS

| | | | | |
|---|---|---|---|---|
| 2010/0182433 A1* | 7/2010 | Shimbo | ............... | G06V 10/143 |
| | | | | 348/E7.085 |
| 2015/0189195 A1* | 7/2015 | Hamann | .............. | H04N 5/2254 |
| | | | | 348/165 |
| 2017/0363541 A1* | 12/2017 | Sandsten | ................... | G06T 5/50 |
| 2017/0374296 A1* | 12/2017 | Schmidt | .................... | G01J 5/10 |
| 2018/0361571 A1* | 12/2018 | Georgeson | ............... | B25J 9/109 |

OTHER PUBLICATIONS

Written Opinion in reference to co-pending European Application No. PCT/EP2019/064234 filed May 31, 2019.

Herbert Kaplan, "Practical Applications of Infrared Thermal Sensing and Imaging Equipment" 3rd edition, pp. 1-4, Jan. 1, 2007, XP055615502.

Lindquist, et al., "Estimation of disconnector contact condition for modelling the effect of maintenance and ageing", Power Tech, Jun. 27, 2005, pp. 1-7. XP031254578.

Vollmer, "Infrared Thermal Imaging: Fundamentals, Research and Applications", Jan. 1, 2018, XP055528829.

Prakash, "Infrared Thermography", IntechOpen, pp. 215-216, Jan. 1, 2012, XP055615792.

Wai Kit Wong et al: "An Effective Surveillance System Using Thermal Camera", Signal Acquisition and Processing, Apr. 3, 2009, pp. 13-17, XP031489592.

Chou et al: "Automatic Diagnostic System of Electrical Equipment Using Infrared Thermography", Soft Computing and Pattern Recognition, Dec. 4, 2009, pp. 155-160, XP031592482.

* cited by examiner

METHOD AND SYSTEM FOR DETECTING HEATING

TECHNICAL FIELD

The invention relates to a method for detecting the heating activity in objects or materials, based on thermal only or thermal and visual data images. Moreover, the method is based on a physics-based model of the underlying heating phenomena within objects or materials such as for instance absorption and emissivity. In particular outdoor applications, i.e. materials or objects detected in an outdoor environment, are considered. A system accordingly for detecting the heating activity in materials or objects is also part of the invention.

BACKGROUND OF THE INVENTION

Outdoor detection of incidents relating to heating activity in materials is very challenging. The thermal image is subject to a myriad of disturbing phenomena that are likely to interfere with the temperature profile of the incident to detect. In particular can be mentioned the varying and unpredictable weather conditions and the natural variations in temperature caused by day and night cycle. A few more detailed examples are given of disturbing factors one can encounter. First, sudden rain for instance causes a combination of a sudden temperature decrease, followed by a slower decrease in temperature by the cooling effect of the cold rain on a warmer surface. In contrast, sudden sun appearing after a cloud causes a sudden temperature increase combined by a slower temperature increase by the absorption of the heat energy by the different objects. Dependent on the absorption, reflection and emissivity properties of the objects in the scene, these temperature profiles will be object dependent as well. Sun coming up after rain can cause reflection of the sun irradiance into the camera where the temperature profile or thermal image detection takes place. Dependent on the reflectivity properties of the object in the field of view in the thermal spectrum, metals can cause the same effect. Day and night cycle will cause a fluent continuous temperature change that has nothing to do with the phenomena to detect, but does have a disturbing influence on it, which cannot be ignored. In an outdoor factory site, production equipment can have different temperatures based on the working mode, such as e.g. starting up, steady state, or stopping of the machinery. Moreover, objects with same temperature may show a different irradiation profile based on their emissivity property. Because of all these and likewise disturbing factors, thermal detection for safety and process monitoring for detection of anomalies in thermal processes are not straightforward and few to find. Applications of thermal cameras outdoors are usually found in the field of surveillance, e.g. for tracking of moving objects, intrusion detection etc. Hence, in general, such outdoor thermal cameras are intended for shape and motion based detection, but not used for temperature-based detection as such. In other words, a solution for the interest is missing in the evolution of temperature, particularly the increase of temperature or the so-called heating of objects or materials within their surrounding outdoor environment, wherein the movement or displacement of outside objects or species with a certain temperature profile becomes less important.

XP031254578 (Lindquist) discusses in the field of maintenance of electric power equipment, as thermographic method, the Delta-T method, comparing the instant temperature of an object with the instant temperature of a reference object. The Delta-T criterion is invoked by referencing this comparison to a table with fixed numbers to assess the electric power equipment condition only.

XP031592482 (Chou) discusses for the same field an infrared anomaly detection algorithm, which after some pre-processing of the instant thermal image and operations across such instant thermal image compares instant temperatures with reference values to finally diagnose the equipment.

XP031489592 (Wong) discusses use of a thermal camera for surveillance in the sense of machine condition monitoring again based on instant thermal images and a totally unrelated trespasser detection, based on temperature range of a human and its shape (reflected in the amount of pixels the human will appear).

AIM OF THE INVENTION

The aim of the invention is to provide an image that represents particularly the heating objects of a monitored outdoor field of view, while taking into account possible disturbing phenomena such as natural day and night cycle, and weather conditions.

SUMMARY OF THE INVENTION

In a first aspect of the invention a method for detection of heating activity in a material is provided. The method comprises of three steps. Initial step is defined by inputting first video data, comprising a plurality of image frames related to temperature. Next, parameters are determined related to change of temperature within the material, based on the inputted first video data. A first detection signal is subsequently generated, this signal being related to heating activity in the material based on the parameters as determined in previous step.

It is worth at this stage to emphasize that the invention by looking at parameters related to change of temperature does use the temporality of the images. As further discussed in the application the invention precisely interprets the time varying image from the viewpoint of the control activity deployed.

According to an embodiment, the method is based on a physics-based model of the underlying heating phenomena within the material. In particular, the generation of the first detection signal as defined by third step of the method is based on such model.

According to an embodiment, the method comprises a further step of determining an estimate of the ambient temperature around the material, based on the inputted first video data or based on inputted ambient temperature, and wherein the second step of determining parameters is performed on the inputted first video data adapted for the ambient temperature estimate.

According to an embodiment, the method comprises a further step of inputting second video data, comprising a plurality of image frames related to visual data, and wherein the method's third step of generating the first detection signal takes into account the inputted second video data related to visual data.

According to an embodiment, the method comprises of following three further steps, of which the first further step is defined by inputting second video data, comprising a plurality of image frames related to visual data. The second further step is defined by generating a second detection signal, being related in heating activity in the material based on the inputted second video data related to visual data.

During the third further step, a third detection signal is generated, this signal being related in heating activity in the material based on the first and second detection signal.

According to an embodiment, as smoke may occur during a heating up activity even before true fire or combustion occurs, the second further step is based on executing a smoke detection method, based on the inputted second video data related to visual data. An exemplary embodiment relies on the methods as described in WO2018020021 (A1).

According to an embodiment, the second further step is performed on a portion of the inputted second video data related to visual, whereas this portion is determined based on the parameters related to change of temperature, these parameters as being determined during the second step of the method.

According to an embodiment, the method comprises a further step of inputting second video data, comprising a plurality of image frames related to visual data, and wherein the method's second step of determining parameters is performed on a portion of the inputted first video data, whereas this portion is determined based on the inputted second video data related to visual data.

According to an embodiment, the method comprises a further step of determining (together or sequentially) one or more estimates of temperature influences around or in the material being detected for heating activity, based on the first inputted video data or alternatively based on the inputted first video data adapted for the ambient temperature estimate. Alternatively the above is applied sequentially, meaning on the inputted first video data being adapted/corrected/compensated for an earlier determined temperature influence. Finally the method's second step of determining parameters is performed on the inputted first video data adapted/corrected/compensated for the temperature influences determined in accordance with any of the above alternatives. In a particular embodiment thereof within these methods, the determining of one or more estimate of the temperature influences around or in the material based on the first inputted video data is based on a physics-based model of the related heating phenomena within the material.

According to an embodiment, any of the methods discussed so far are applied for one or more of the steps on first inputted video, subjected to a nonlinear scaling.

In a second aspect of the invention a system is provided, suitable for detecting heating activity in a material. The system comprises first sensors for inputting video data, comprising a plurality of image frames related to temperature. The system also comprises a computing device, coupled to the first sensors, the system being adapted for performing the three steps of the method in accordance with the first aspect of the invention. According to an embodiment, the system is also adapted for performing the method being based on a physics-based model of the underlying heating phenomena within the material. According to an embodiment, the system is also adapted for performing the method comprising further the step of determining an estimate of the ambient temperature around the material, based on the inputted first video data or based on inputted ambient temperature, and wherein the second step of determining parameters is performed on the inputted first video data adapted for the ambient temperature estimate.

According to an embodiment, the first sensors are based on an array of infrared (IR) thermopiles and/or bolometers.

According to an embodiment, the system further comprises second sensors for inputting video data, comprising a plurality of image frames related to visual data, wherein these second sensors are also coupled to the computing device, the system being adapted for also performing one or more further steps of the method in accordance with the first aspect of the invention as described with the different embodiments above.

According to an embodiment, the system further comprises means for inputting the ambient temperature, wherein this means is also coupled to the computer device.

According to a third aspect of the invention, a data processing system is disclosed comprising means for carrying out the method for detection of heating activity within a material according to first aspect of the invention. In other words, a data processing system is provided for applying the method for detection of heating activity in a material as mentioned above.

According to a fourth aspect of the invention, a computer program is disclosed comprising software code adapted to perform the method for detection of heating activity in a material according to first aspect of the invention. Hence, in addition to a detection method, accompanying system and a data processing system, the invention also relates to a computer program representing the corresponding software code, and being operable on a processing engine, for executing any of the steps of the method for detection of heating activity in a material as mentioned above.

According to a fifth aspect of the invention, a non-transitory machine-readable storage medium or else a computer readable storage medium is disclosed comprising and storing the computer program according to fourth aspect of the invention, i.e. comprising software code adapted to perform the method for detection of heating activity in a material according to first aspect of the invention. Thus, a computer readable storage medium comprising the computer program with the software code is also part of the invention.

DETAILED DESCRIPTION OF THE INVENTION

Figure 1:
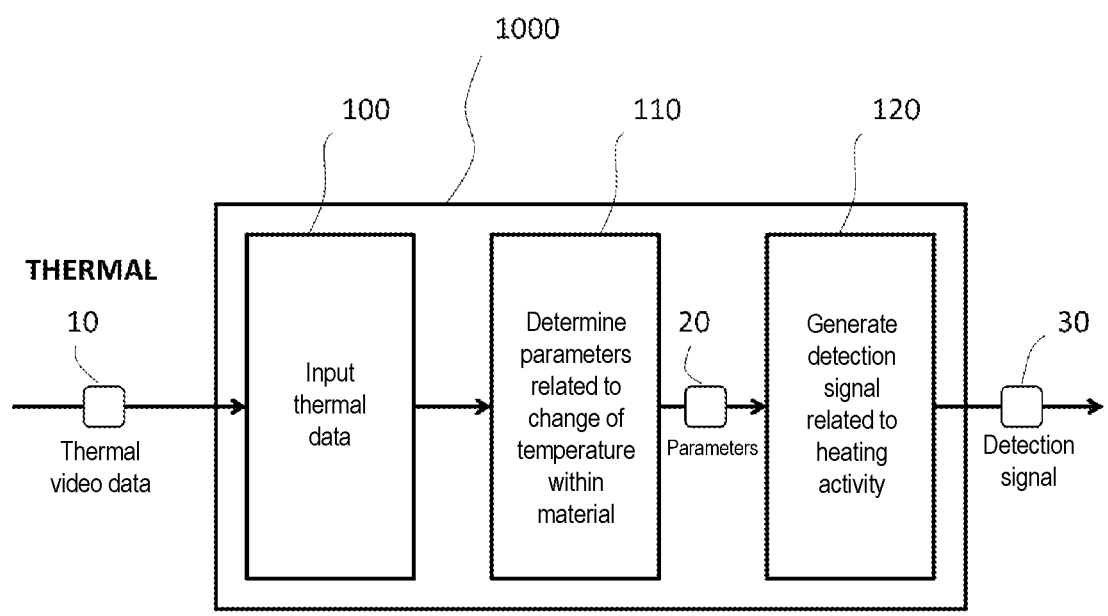
FIG. 1 illustrates schematically an embodiment of the method for detection of heating activity in a material, based on inputting of only first video data related to temperature, in accordance with the invention.

The invention relates to thermal camera image based material inspection, in particular detecting within such image indications of unwanted thermal or heating activity within said material, to thereby generate further actions, such as alarms and/or concrete actions for trying to bring such unwanted thermal activity back under control. The approach is fruitful within a context wherein said material is not directly or easily accessible and/or of such a large scale, that at distance thermal imaging, possibly in combination with other imaging, it is the only feasible method. In essence within a 2D time varying image (in the digital world represented by plurality of image frames) thermal or heating activity should be determined, interpreted as being of interest or not from the viewpoint of the control activity deployed. Given the above context, one comes confronted with many influences, which may appear in the 2D temperature data captured by the thermal camera, which may disturb the true detection of the heating phenomena one likes to supervise. Contrary to the available temperature data, thermal activity is characterized by temperature changes, hence the thermal camera image based material inspection explained above, requires determining temperature change information, from the potentially disturbed 2D data.

In a preferred embodiment the unwanted thermal or heating activity is assumed to be well understood from its physics point of view and such knowledge is exploited in the detection method in accordance with the invention. Indeed, instead of just determining a rate of change, which is challenging and a huge source of error when dealing with noise and disturbed data, preferably a representative model of the underlying reality is made, and the parameters of said model are determined with use of the available data. Further said parameters are then interpreted against the available information of the material. In an exemplary embodiment said representative model is a first order model, based on a thermal energy balance equation, wherein the estimated parameter is the time constant thereof and the estimated time constant is compared with a computed time constant, which will then depend on the mass and heat capacity of said material. In a further exemplary embodiment, one exploits the knowledge that certain heat phenomena start or are local but obviously impact the local environment and hence other pixels in the image. In an exemplary embodiment such representative model is a second order model in place coordinates, and the estimated parameter is the heat diffusion to the neighborhood. To be clear, in a case where the change of temperature in a pixel is rather caused by a disturbance (for instance a reflection of the sun on metal, being part of the material), such model will not provide realistic parameters, indicating that the measured change is not due to the phenomena to be supervised. It is precisely this distinguishing capability that is required in the proposed approach of the invention.

The above description can be applied on the data as captured by the thermal camera. However a more elaborated approach, wherein first the data is sort of cleaning from one or more influences, in order to make the above approach even more effective, is possible also. Indeed, also about certain influences a good understanding of the underlying physics understanding is available. Along the same lines as above those can be modeled and if such model can be calibrated, the captured data can be corrected for the influence in a reliable way. In an exemplary embodiment, the example of ambient temperature can be given. Indeed the physical characteristic of this influence is rather easy, in that it appears at least in principle in all pixels. Exploiting this knowledge for instance by computing an average across the pixels leads to a reliable estimate of such ambient temperature, which can then be subtracted from the captured data, then this new data is further used for detecting purposes. Besides ambient temperature also other phenomena can be modeled. For instance in the case where the change of temperature in a pixel is rather caused by a disturbance like the reflection of the sun on metal, being part of the material, the underlying model and model parameter estimation, now modeling reflection based heating in the pixel data, will provide parameters, confirming or not, that it is a plausible cause of temperature change observed, which is unrelated to the phenomena we are concerned about. Correcting the data based thereon, will provide cleaner data, more suitable for then finally model based detection.

Various combinations of model-based correction and model-based detection can be created. In a preferred mode, as much as possible corrections are performed, preferably on a per influence basis, hence sequentially one after another. However, also joint model-based correction for a combination of otherwise mutually disturbing phenomena can be performed.

In particular the invention relates to estimating the thermal disturbance based on physics-based modeling of the disturbing (natural) phenomena, then compensate and/or subtract this from original thermal image, resulting in an image that represents only the heating objects of the monitored field of view within the outdoor environment.

Different phases below describe the modelling architecture for estimating the natural or environmental phenomena disturbances, and eliminating and/or compensating for those such that only heating objects images or so-called heating images remain. Hence, the result is an image that represents only the heating objects of the monitored field of view.

As a first phase, a kind of formula related to the setting is described. Amongst the disturbances or so-called disturbing factors (of the environment), a lot of these only have a time dependent component, and are locally invariant. The emissivity or radiation profile as a function of temperature of a global image can be modelled as:

$$E(x,y,t) = E_{object}(x,y,t) - E_{ambient}(t)$$

In other words, there are two contributions in determining emissivity, i.e. one from the object (depending on location and time) and one from the surrounding environment (here, only depending on time). This emissivity can also be referred to as irradiance.

The emissivity of the surrounding environment $E_{ambient}(t)$ can either be modelled or determined based on the global image, or either is measured by an external device, and thus an external parameter can also be used. With any of these definitions of the surrounding environment emissivity, the emissivity of the object for which we want detect the heating activity can be defined as:

$$E_{object}(x,y,t)=E(x,y,t)-E_{ambient}(t)$$

This object emissivity is further referred to as heating image, whereas the impact of global environment changes in temperature due to for example global weather conditions and/or night and day cycles. The resulting heating image $E_{object}(x,y,t)$ thus provides us the possibility to focus on the real heating phenomena occurring within the object or material to be detected.

In a second phase, the possible values for the heating image $E_{object}(x,y,t)$ are categorized. For detecting anomalies in temperature, especially here in the detection of heating activity, one is merely interested in a temperature increase rather than a decrease. Moreover, depending on the phenomenon to detect, a definition for the maximum temperature is most wanted. The categorization of the heating image will allow increasing the temperature scale resolution (with high accuracy) for processes with high sensitivity, where we want maximum resolution on a narrow temperature range on the one hand, versus processes where detection is only wanted in the range of high temperatures on the other hand. Therefore, the heating image is categorized or rescaled as $$E_{object}(x,y,t)=0, E(x,y,t) \leq E_{ambient}(t)$$

$$H_{max}, E(x,y,t) \geq H_{max}$$

$E'(x,y,t)$ otherwise

The value $H_{max}$ is defined depending on the phenomenon to detect, for instance for heating $H_{max}=70°$ C., whereas for fire $H_{max}=500°$ C. is possible.

Further, by means of example, a 0-70° C. temperature range is detected, or even a smaller range of 0-20° C. is considered, wherein a higher accuracy in measurements can be achieved.

As a result, the original thermal global image has been converted to a heating image, being reduced from global environmental influences, and optimized in the temperature range of the real heating phenomena to detect.

In a third phase the heating image only is further considered, wherein still disturbances may be present while interfering related to the objects in the scene, i.e. no longer the global environment. Such disturbances are for example due to differences in absorption coefficient, reflectivity and emissivity, being key factors of an object's behaviour in a thermal image. More in particular, different types of material react differently to the sun warming them up or cooling down properties. By means of example, the sun comes up, in an environment with wood and/or concrete objects or materials. Both materials wood and concrete have different absorption characteristics. In case of wood, there is more absorption, which it releases as radiation. Therefore, wood will also show a different temperature profile than the background, which may lead to false detection if not included within the model. Moreover, based on the modelling of most of the disturbances, it becomes possible to compensate for their effects.

Next to materials properties, other examples leading to further disturbances can be for instance live species such as animals e.g. rats, cats in waste environments, or people. Stationary they warm up a spot, and hence represent a heating signature. The invention provides in defining this unwanted detection within the model, such that exclusion based on modelling can be performed. It is moreover noted, that this way the exclusion is not referring to shape neither to motion analysis as known and often used according to the art for trespassing detection per se. On the contrary, with the invention the direct temperature effect is determined and moreover when retained as hypothesis for being a disturbance, that direct temperature effect is compensated for.

By knowing and modelling all influences that can interfere with the thermal signature, it is possible to compensate for them, e.g. by means of subtract the unwanted detection. As a result, a further cleaned heating image is only displaying relevant active heating objects, producing more heat then the background.

In a final, fourth phase only the wanted phenomenon is detected.

The invention provides also a system for executing the above methods. The computing device is hence equipped with computation means (processors and/or controllers) and storage means (memory) sufficient to handle the involved (thermal and/or visual) images. Given that the method determines parameters of a model by use of available data, the system has to support model fitting, preferably adapted for handling real-time progressing data, which in essence boils down to an optimization problem minimizing a fit error.

Further since the method relies on comparing the determined parameters with expected parameters either of the underlying heating phenomena in the material or assumed influences/disturbances, the system will store (a database of) representative parameters of those and facilitates a (fast) comparing and taken of accounts based thereon, such as correcting the data for influences, guiding the algorithms to certain portion of the data, and/or predicting a possible occurrence of the to be detected event for final generating detection or alarm signals.

DETAILED DESCRIPTION OF THE DRAWINGS

In FIG. 1 an embodiment is schematically represented of the method 1000 for detecting the heating activity in a material, according to the invention. The method 1000 is represented as a closed box with input (at left side of the box) and output (right from the box). At the input of the closed box, video data 10 comprising a plurality of image frames related to temperature or else called thermal video data 10 further referred to, is entered for initiating the method 1000. The inputting of this thermal video data 10 is seen as a first step 100 of the method 1000. Next, as a second step 110, parameters 20 related to change of temperature within the material and based on the inputted thermal video data 10 are determined. These parameters 20 are then used for generating a detection signal 30 related to heating activity in the material, as a third step 120 of the method 1000. Whereas the parameters 20 are based on the inputted thermal video data 10, the detection signal 30 being generated from these parameters 20 is also based on the inputted thermal video data 10. The detection signal 30 is led to the output of the closed box. According to an embodiment, the third step 120 is based on a physics-based model of the underlying heating phenomena within the material of which the activity is detected.

Figure 2A:
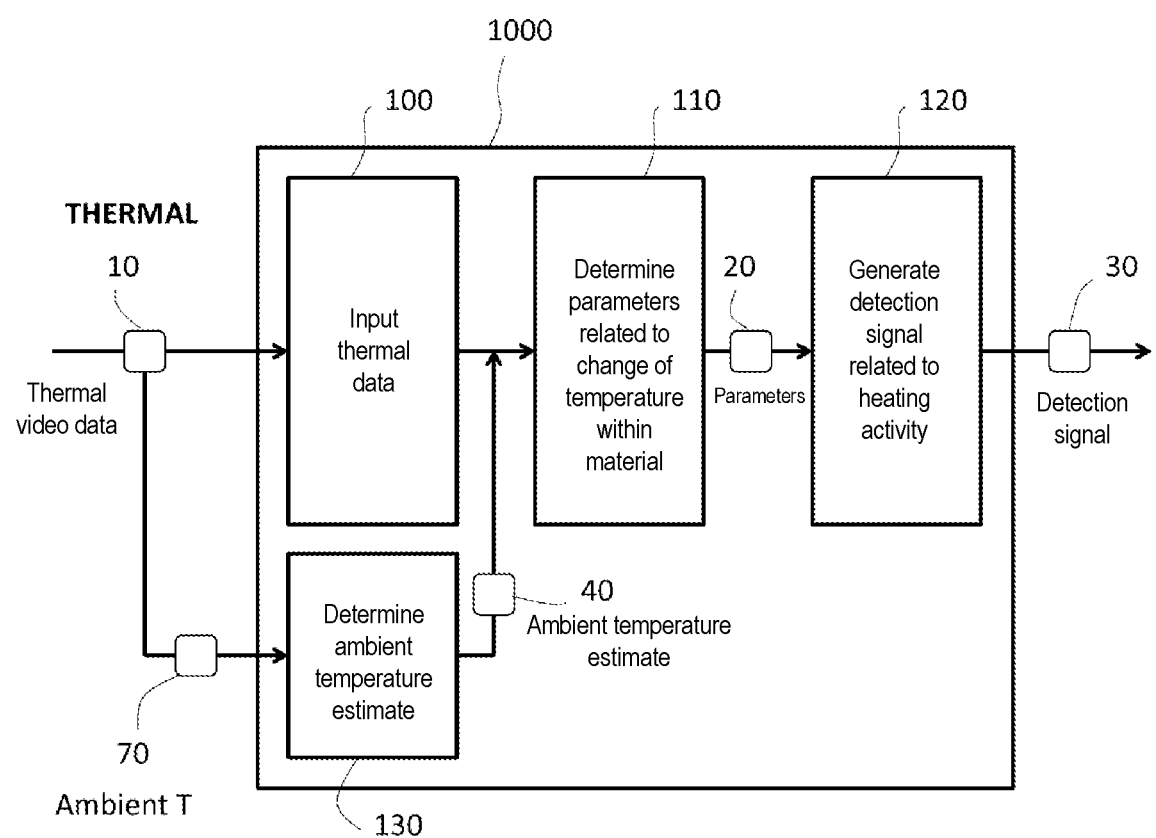
FIGS. 2a and 2b illustrate schematically a further embodiment of the method of FIG. 1, wherein the ambient temperature around the material is estimated (FIG. 2a) based on the inputted first video data, or (FIG. 2b) based on inputted ambient temperature, in accordance with the invention.
Figure 2B:
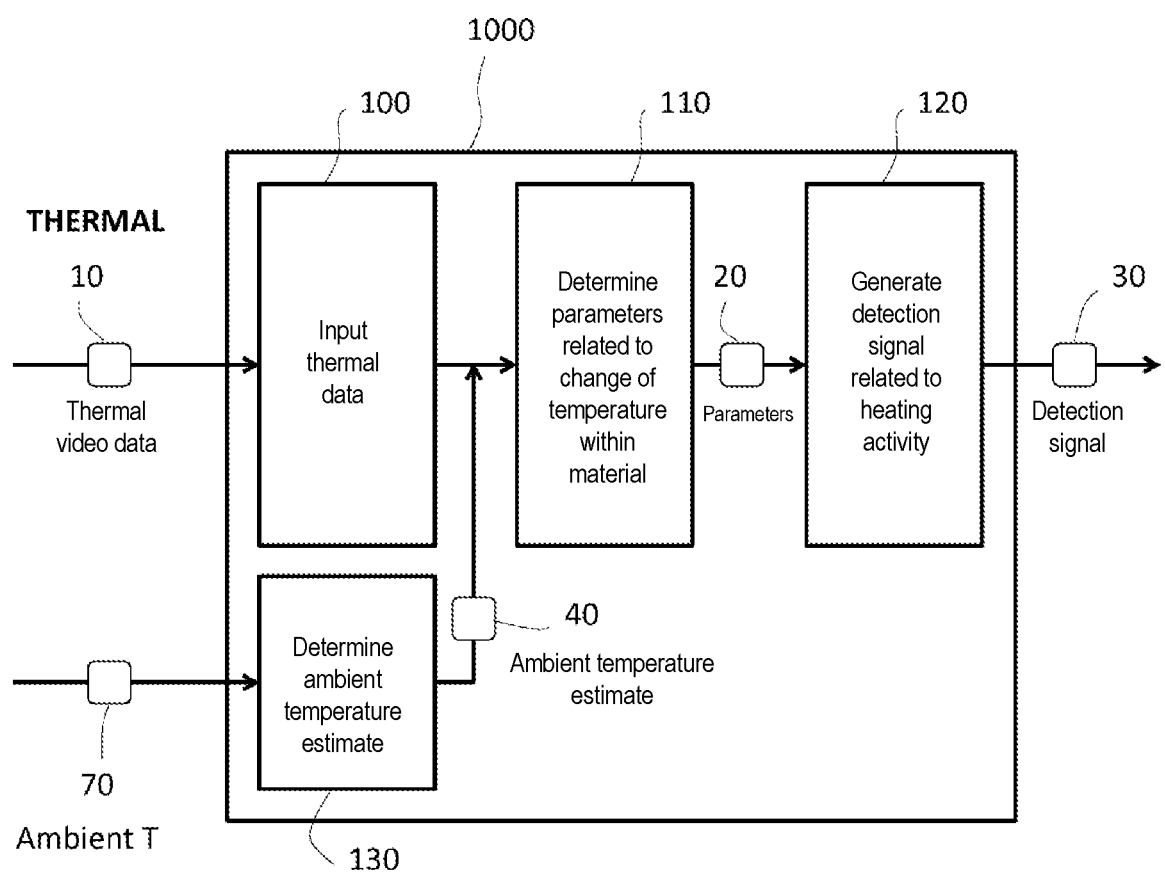

Both FIG. 2a and FIG. 2b illustrate a further embodiment wherein the ambient temperature 70 around the material (for heating activity is detected) is also used as input data for the method 1000, and thus also inputted in the closed box. The ambient temperature 70 is either inputted as an external parameter such as depicted in FIG. 2b, or else the ambient temperature 70 is based and derived from the inputted thermal video data 10. An additional step 130 is part of the method 1000, for determining an ambient temperature estimate 40, for being used within the second step 110 of the method 1000. With this ambient temperature estimate 40 an adapted version of the inputted thermal video data 10 can be made. The second step 110 determining parameters 20 is then performed on the adapted version of this inputted thermal video data 10 taking into account the ambient temperature estimate 40.

Figure 3:
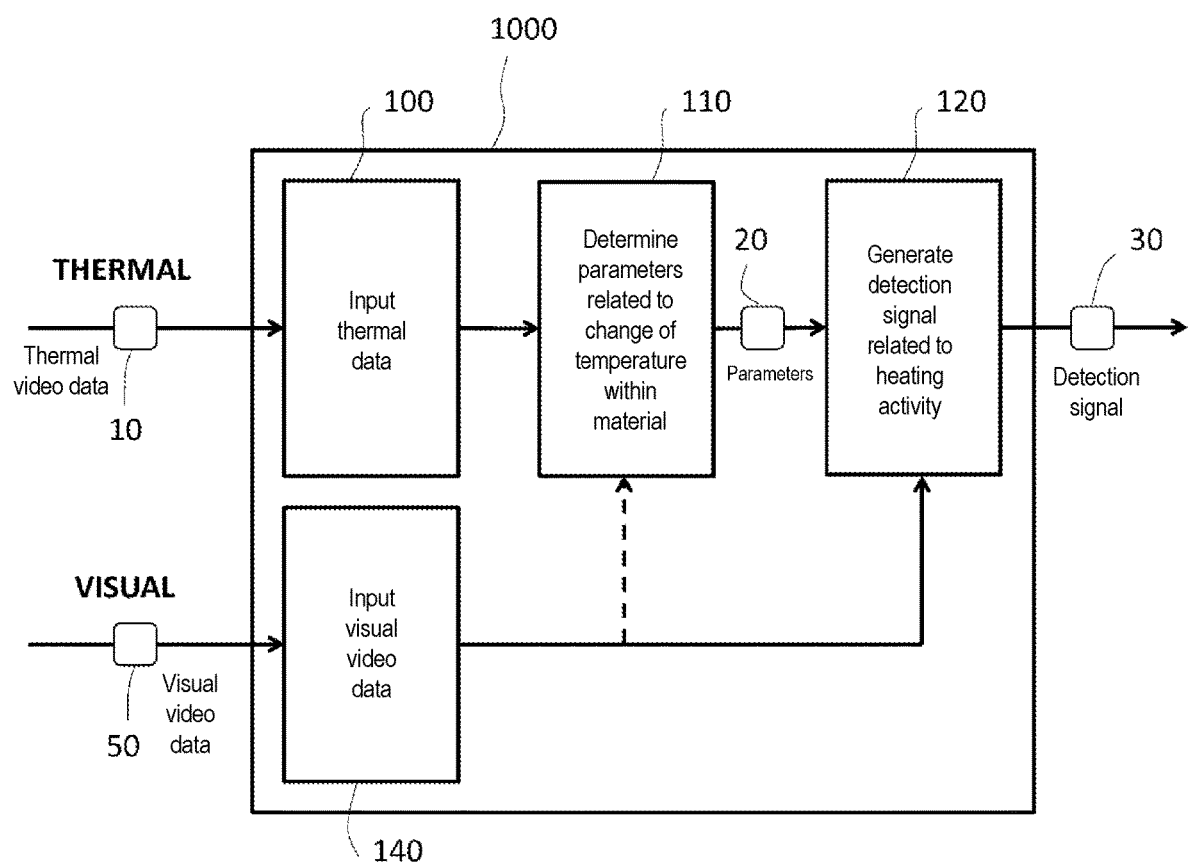

With FIG. 3 an embodiment is given wherein the method 1000 as described with FIG. 1 further comprises a step 140 for inputting video data 50 comprising a plurality of image frames related to visual data or else called visual video data 50 also referred to. The third step 120 of the method 1000 for generating the detection signal 30 takes into account this inputted visual video data 50. According to an embodiment, the inputted visual video data 50 is also used within the second step 110 of the method 1000 for determining parameters 20 based on the inputted thermal video data 10.

Figure 4:
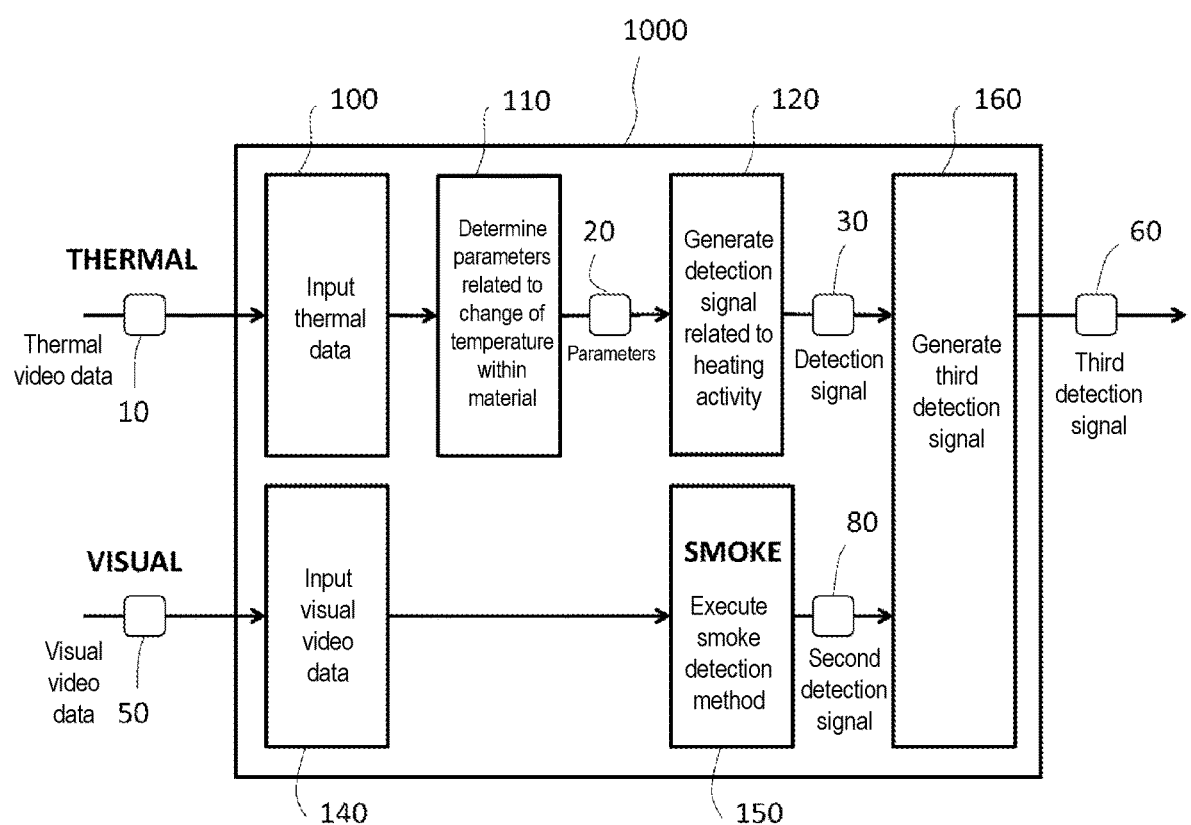
FIG. 4 illustrates schematically a further embodiment of the method of FIG. 3, wherein further steps are defined, in accordance with the invention.

In FIG. 4 an extended version of the embodiment as schematically depicted in FIG. 3 is given. Here, with this extended version, the method 1000 comprises additional steps, next to the three basic steps 100, 110, 120 from FIG. 1, and FIG. 3 step 140 of inputting video data 50 comprising a plurality of image frames related to visual data or else called visual video data 50. A first additional step 150 is defined by generating another detection signal 80 related to heating activity in the material based on the inputted visual video data 50. During a second additional step 160 yet another detection signal 60 is generated related to heating activity in the material based on the other two detection signals 30, 80 related to heating activity in the material based on inputted thermal or either visual video data 10, 50 respectively. According to an embodiment, the first additional step 150 is based on executing a smoke detection method, on its turn based on the inputted visual video data 50. In an exemplary embodiment the first and second detection signal are logically combined (by use of AND, OR, IF THEN operations) to generate a third detection signal. For example, while both the first and second detection signal might get generated when a certain threshold (for instance in parametric deviation) occurs, threshold which should not be set too low to avoid false detection, one may implement a logic scheme, lowering the thresholds for one or both of them when detection occurs in the two quite diverse set of images (the thermal and visual one). FIG. 15 illustrates the AND operation of the detection signals. This figure also illustrates the use of further signals 2020, 2030 such as thresholds and/or confidence level in the determined parameters (or comparisons as explained in relation to the embodiment explained in FIG. 14 below).

Figure 5:
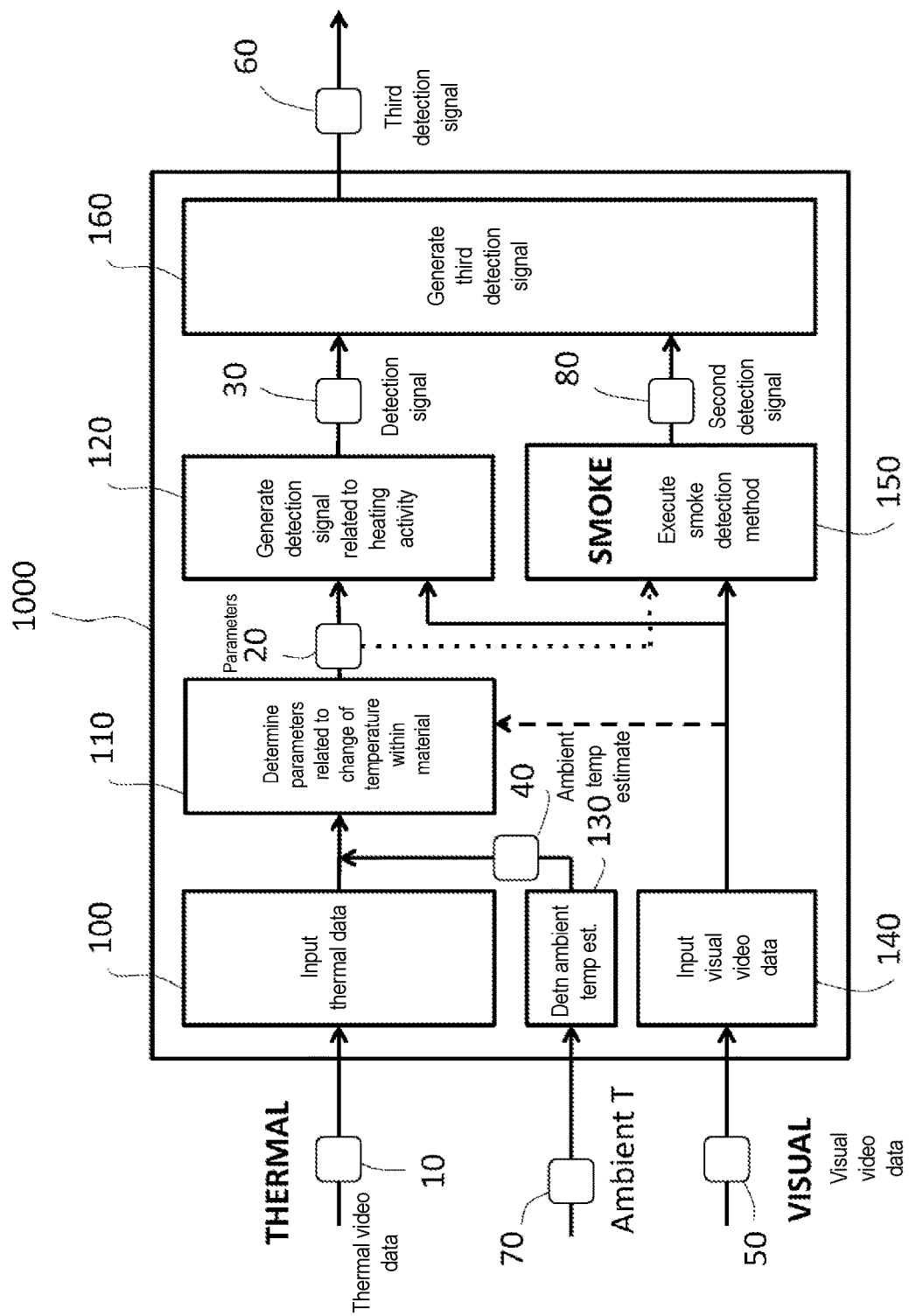
FIG. 5 illustrates schematically another further embodiment of the method of FIG. 3, wherein further steps are defined, and wherein the ambient temperature around the material is estimated, in accordance with the invention.

A further extended version of the embodiment of FIG. 3, and hence also of FIG. 4, is schematically represented in FIG. 5. The ambient temperature 70 around the material (for heating activity is detected) can now also be used as input data for the method 1000, and thus acting as possible input for the closed box. As illustrated in FIG. 5, the ambient temperature 70 here is inputted as an external parameter. Alternatively, according to another embodiment, the ambient temperature 70 can be based and derived from the inputted thermal video data 10. An additional step 130 is part of the method 1000, for determining an ambient temperature estimate 40, for being used within the second step 110 of the method 1000. With this ambient temperature estimate 40 an adapted version of the inputted thermal video data 10 can be made. The second step 110 determining parameters 20 is then performed on the adapted version of this inputted thermal video data 10 taking into account the ambient temperature estimate 40. In FIG. 5 is further depicted that for the second step 110 being performed on a portion of the inputted thermal video data 10, this portion is determined based on the inputted visual video data 50 as indicated by means of the dashed line with arrow. Moreover, is in FIG. 5 shown that for the first additional step 150 being performed on a portion of the inputted visual video data 50, this portion is determined based on the determined parameters 20 from the second step 110, and being related to change of temperature, as indicated by means of the dotted line with arrow.

Figure 6:
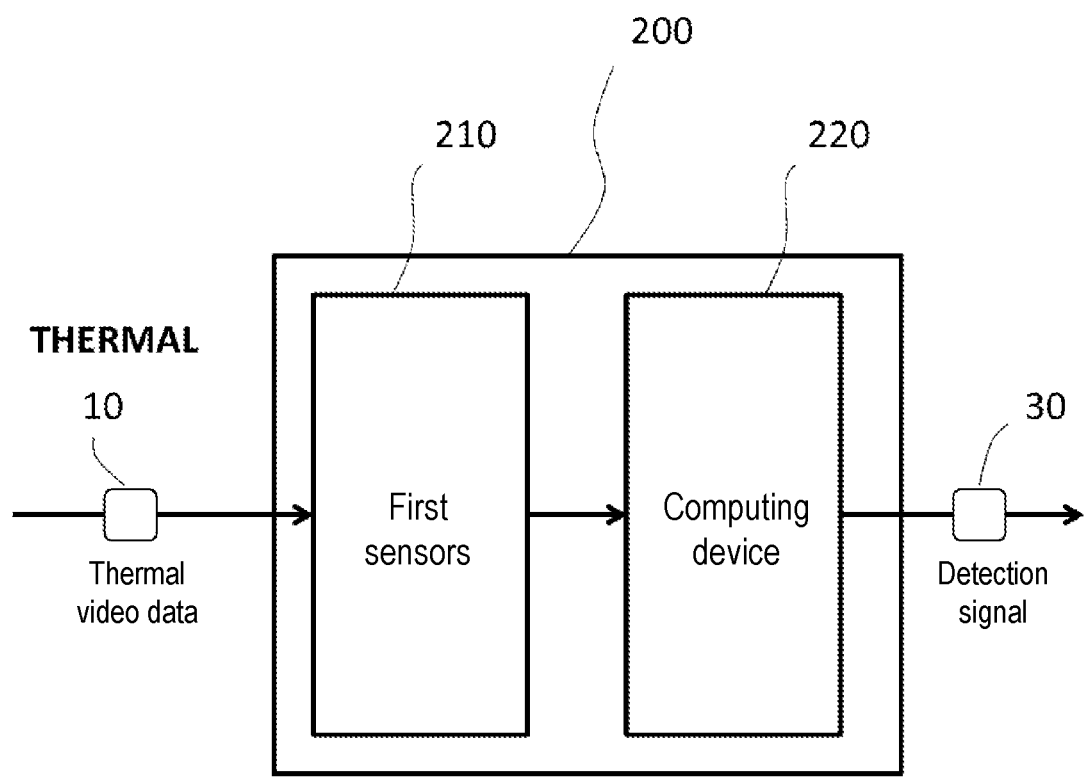
FIG. 6 shows schematically an embodiment of the system for detection of heating activity in a material, based on inputting of only first video data related to temperature, in accordance with the invention.

In FIG. 6 an embodiment is schematically represented of the system 200 suitable for detecting the heating activity in a material, according to the invention. The system 200 is represented as a closed box with input (at left side of the box) and output (right from the box). At the input of the closed box, video data 10 comprising a plurality of image frames related to temperature or else called thermal video data 10 further referred to, is inputted to the system 200. The system 200 comprises first sensors 210 for inputting this thermal video data 10. The system further comprises a computing device 220, coupled to the first sensors 210 and being adapted for performing the basic three steps 100, 110, 120 of the method 1000 for detecting the heating activity in a material, including the additional step 130 of determining an ambient temperature estimate 40, in accordance with the invention. Hence, as a result, a detection signal 30 related to heating activity in the material based on inputted thermal visual video data 10 is generated and outputted from the system 200. According to an embodiment, the first sensors 210 are based on an array of IR thermopiles and/or bolometers.

Figure 7:
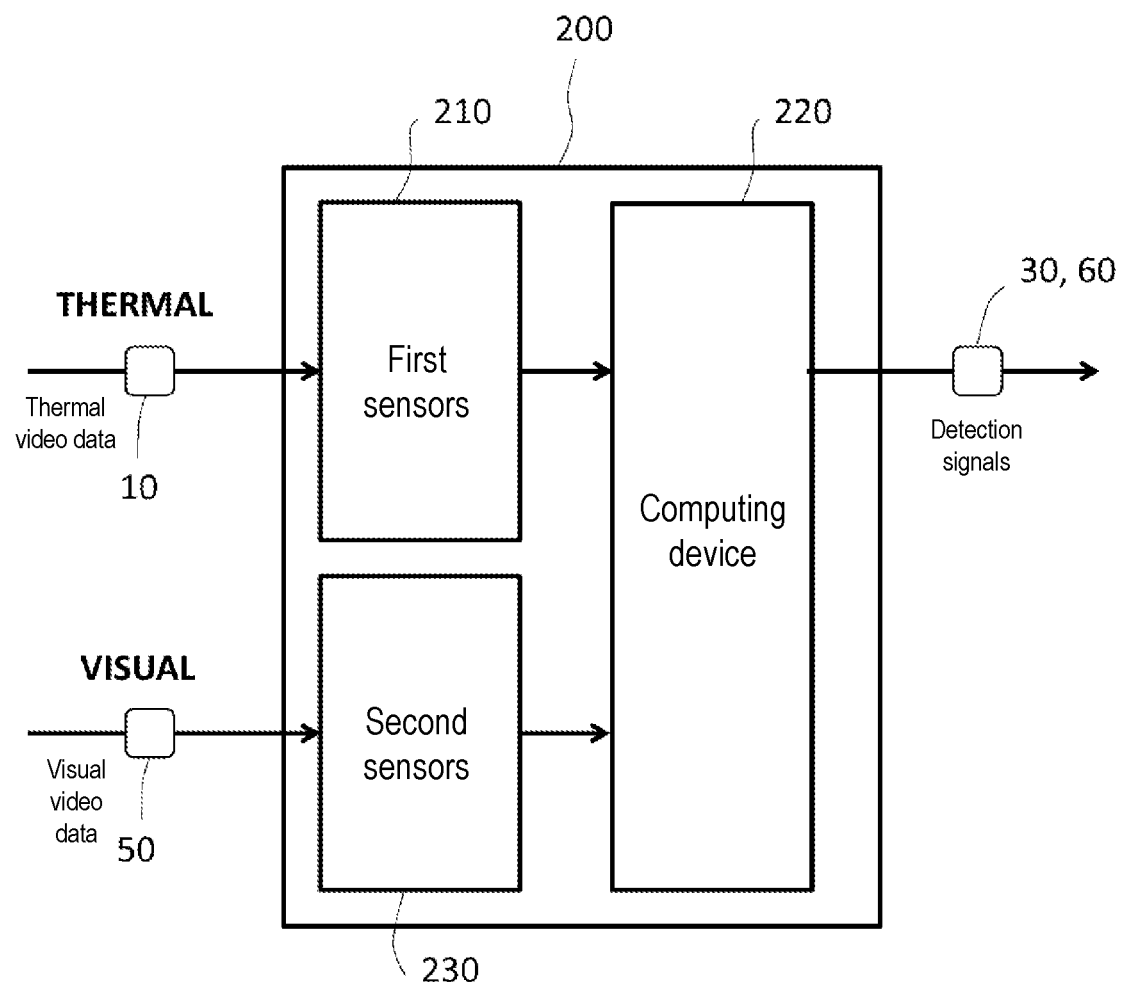
FIG. 7 shows schematically an embodiment of the system for detection of heating activity in a material, based on inputting of first and second video data related to temperature and visual data respectively, in accordance with the invention.

With FIG. 7 an embodiment is given wherein the system 200 as described with FIG. 6 further comprises second sensors 230 for inputting video data 50 comprising a plurality of image frames related to visual data or else called visual video data 50 also referred to. The second sensors 230 are coupled to the computing device 220 being adapted for also performing the additional steps 150, 160 of the method 1000 for detecting the heating activity in a material based on inputted thermal and/or either visual video data 10, 50 in accordance with the invention.

Figure 8:
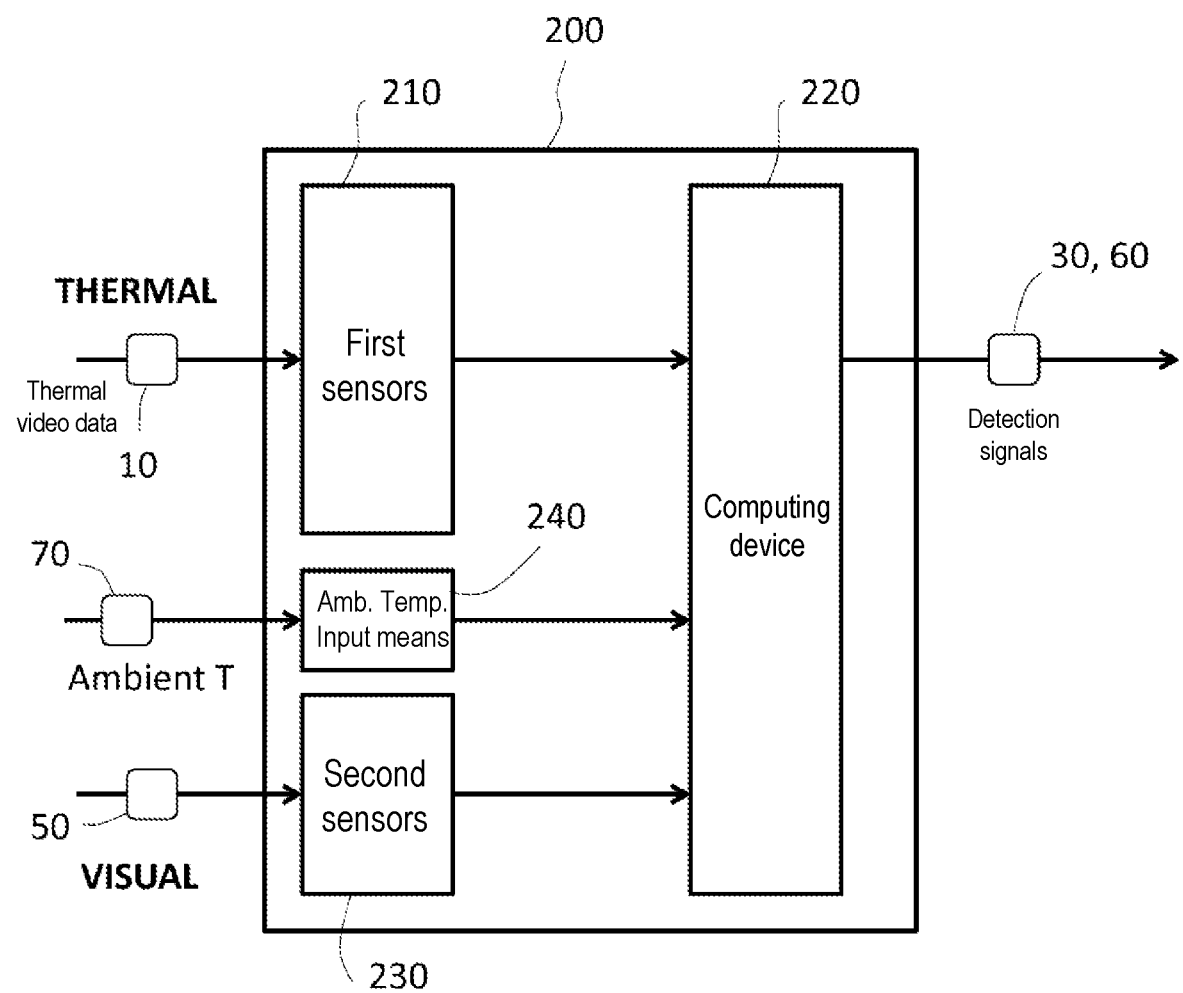
FIG. 8 shows schematically a further embodiment of the system of FIG. 7, wherein the ambient temperature around the material is estimated, in accordance with the invention.

FIG. 8 illustrates a further embodiment of the system 200 wherein the ambient temperature 70 around the material (for heating activity is detected) is also used as input data for the system 200, and thus also inputted in the closed box. The ambient temperature 70 is either inputted as an external parameter such as depicted here, or else the ambient temperature 70 is based and derived from the inputted thermal video data 10 (not shown). The system 200 comprises means 240 for inputting the ambient temperature 70, wherein this means 240 is coupled to the computing device 220 for performing computations and calculations thereof or therewith.

In the above system embodiments of FIGS. 6, 7 and 8, coupling may be either wired or wirelessly connected. Further the computing device may be a distributed system, wherein for instance part of the methods or related sensor signal processing occurs local (close to those sensors) while another part of the methods or further computer processing of generated detection signals takes place at a distance place (for instance by use of cloud processing).

Figure 9:
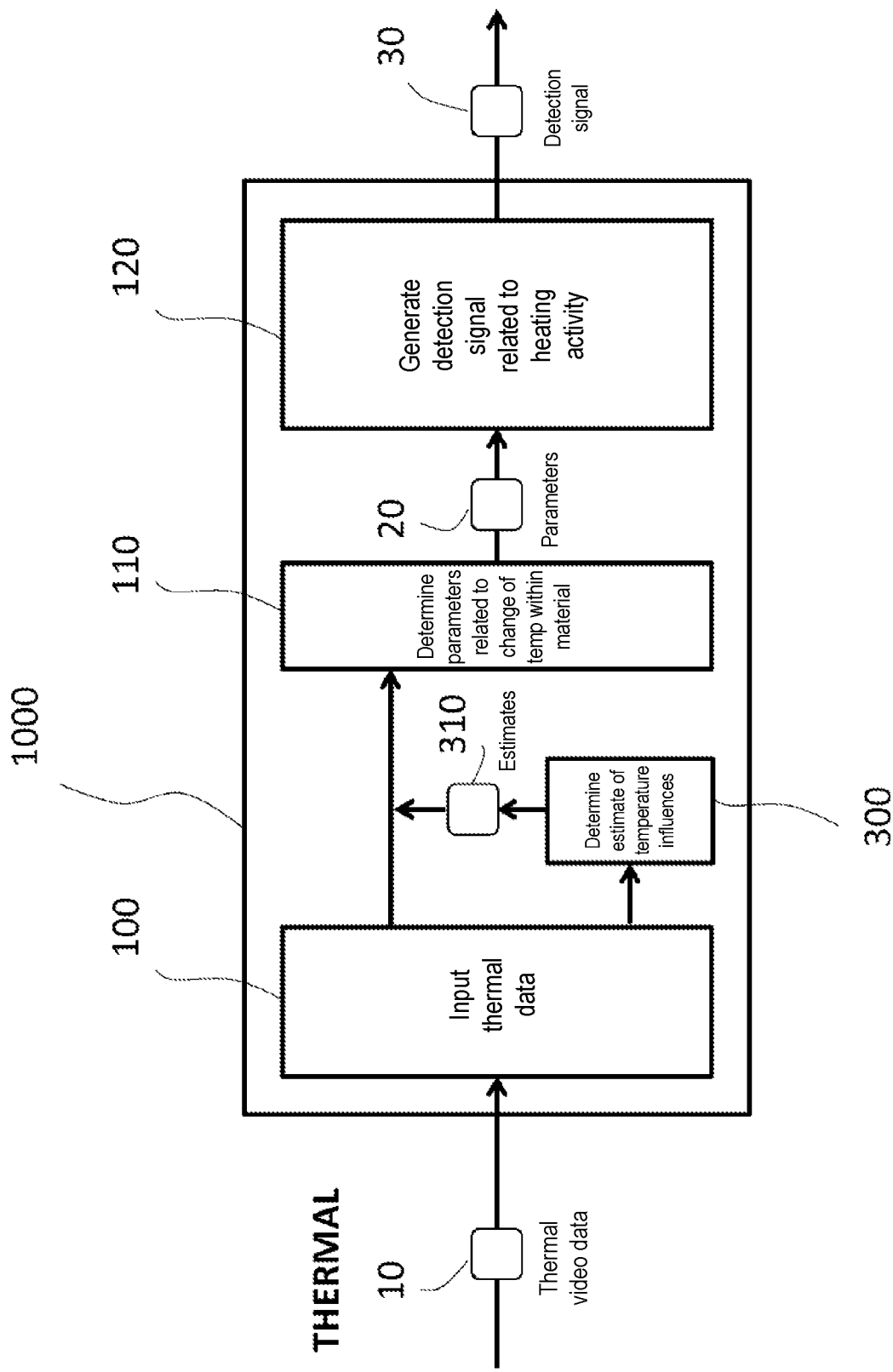
FIG. 9 illustrates schematically a further embodiment of the method of FIG. 1, wherein a further step is defined for determining one or more estimates of temperature influences around or in the material, in accordance with the invention.

FIG. 9 illustrates a further embodiment wherein an additional step 300 is part of the method 1000, as compared to FIG. 1. The additional step 300 is intended for determining one or more estimates 310 of temperature influences around or in the material for which heating activity is detected, for being used within the second step 110 of the method 1000, in accordance with the invention. With this one or more estimates 310 of temperature influences an adapted, corrected or compensated version of the inputted thermal video data 10 can be made. The second step 110 determining parameters 20 is then performed on the adapted version of this inputted thermal video data 10 taking into account the one or more estimates 310 of temperature influences.

Figure 10:
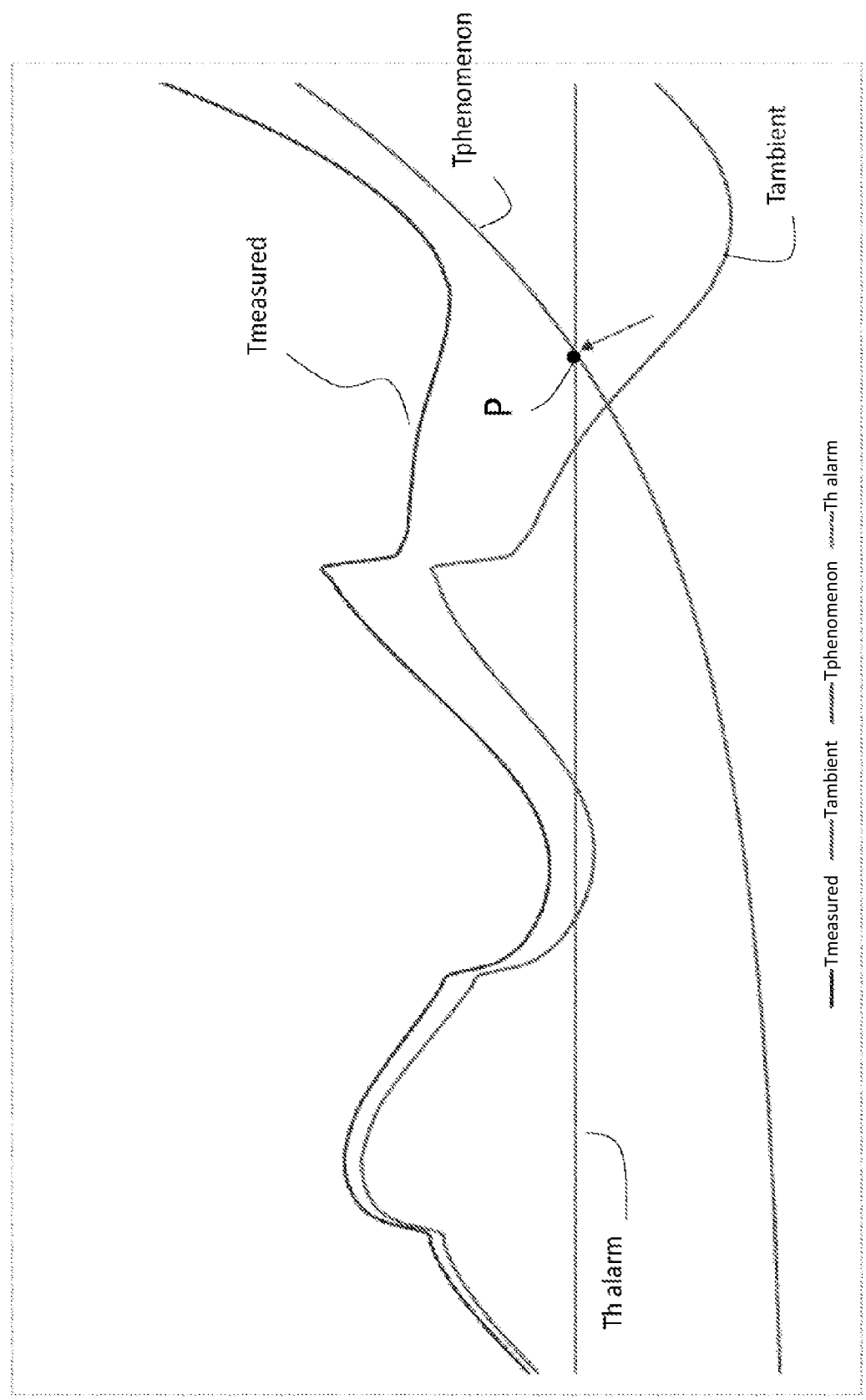
FIG. 10 illustrates an embodiment of a simulation of the measured temperature over a period of about two days, representing heating, in accordance with the invention.

FIG. 10 shows a graphical representation of an embodiment simulating measured temperature over a period of about two days, herewith representing heating, in accordance with the invention. A curve Tmeasured equals the overall measured temperature in a spot or an area wherein heating occurs. Another curve Tambient illustrates the ambient or environmental temperature over the same period of time as T measured. The curve Tphenomenon is calculated and determined by means of the difference between Tmeasured and Tambient, or in other words, Tphenomenon equals the subtraction of Tambient from Tmeasured. This means that Tphenomenon is in fact depicting what we really want to know, i.e. the heating of the object or material to be detected for heating activity, without any noise or false indicating effects from the environmental conditions such as e.g. changes in weather or day and night cycle. Day and night in particular is recognizable in the curves by means of the wave-alike representation, due to temperature rising for the day starting, and temperature decreasing at night. A steep fall may be due to rain, and rapid cool down of the area. A strong increase may be the result of a sunny time of the day. The curve Th alarm is a threshold curve, indicating when heating occurs. At the point P in FIG. 10 the curve Tphenomenon is going above the threshold and hence, at that point heating activity of the object or material in the environment is detected. According to an embodiment, the speed of warming up is amongst other parameters also included in the determination of the point P, where heating is alarmed.

Figure 11:
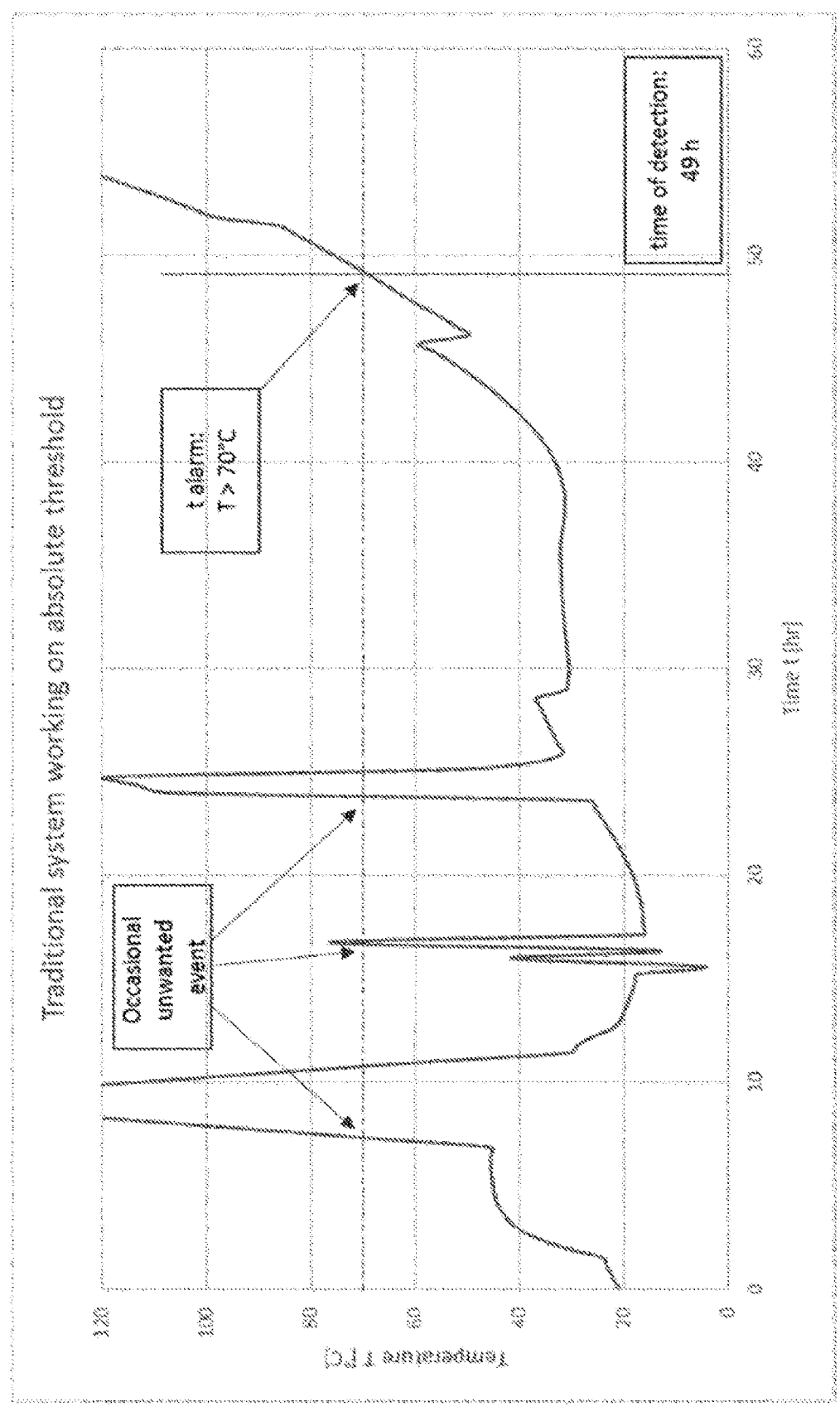
FIG. 11 illustrates an embodiment of a captured infrared image representing measured temperature profile in function of time and position, in accordance with the invention.

FIG. 11 illustrates an embodiment of an inputted infrared image temperature profile, represented by the curve T(x,y,t) of the inputted infrared image on pixel with position (x,y) in the image. The measured temperature profile is given as a function of time (t) and position (x,y). Most systems detecting thermal anomalies are based on absolute thresholds. For the detection of heating, the threshold is often set at 70° C. Current systems in the art mostly refer to indoor applications, wherein disturbing factors for example sun are limited. The present invention focuses on detection in outside areas or outdoor environments, wherein measurements using known detection technologies are heavily subject to false notifications. Considering the temperature profile of FIG. 11, the outdoor influences are particularly illustrated on said pixel. Hence, a real heating alarm is only detected after 49 hours, although high temperature peaks reaching above threshold were already present before, as indicated by the three arrows for occasional unwanted events. The time of detection is moreover delayed due to sudden rain showers, as indicated by the steep falls or decreases in the curve. The curve of FIG. 11 is used as input data for the detection method in accordance with the invention. Further computations and processing is performed on this input data, whereas such data is typically used only (standalone) as measurement for conventional detection methods in the art.

Figure 12:
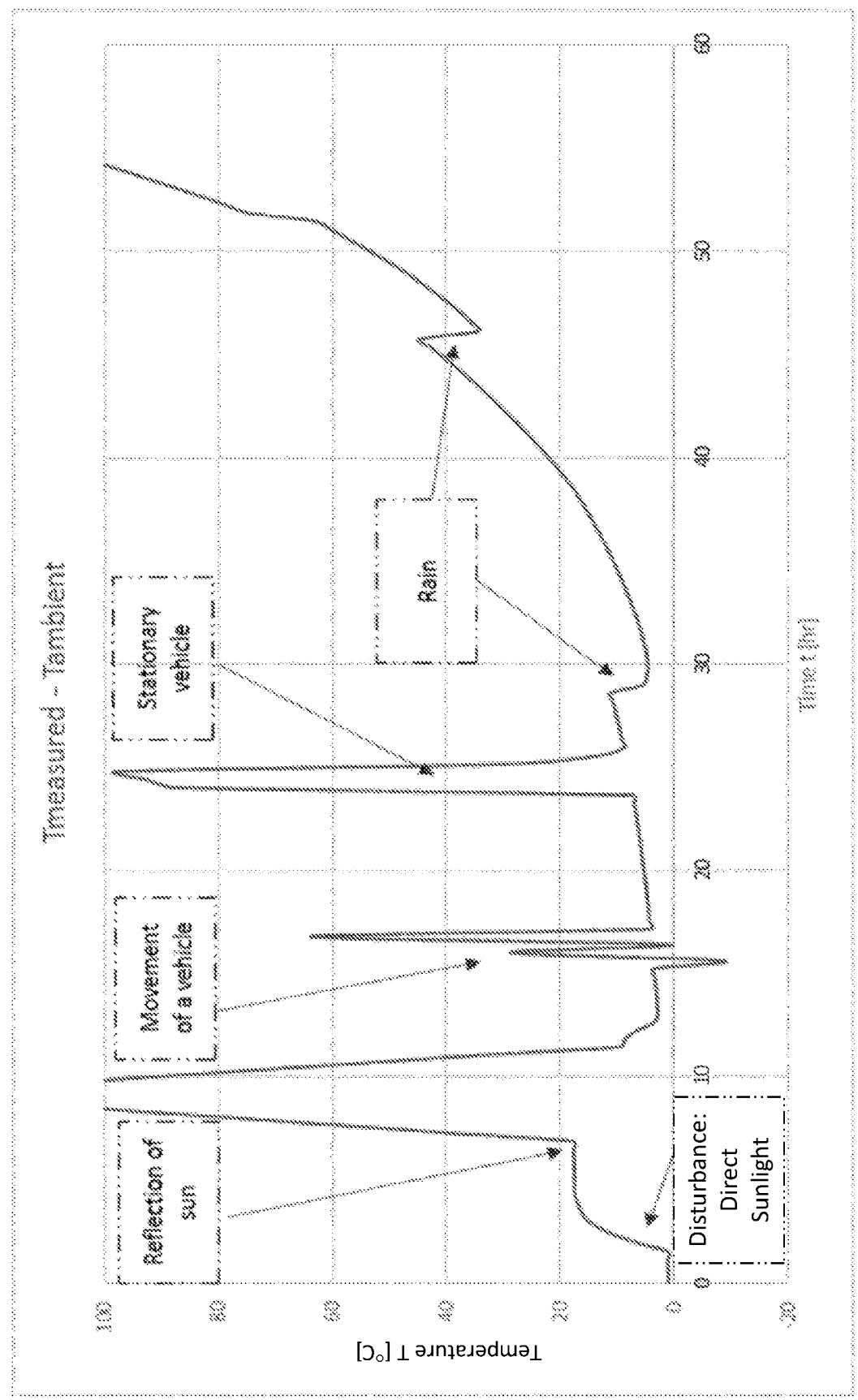
FIG. 12 illustrates an embodiment of an infrared image representing measured temperature profile in function of position compensated for Tambient over time, in accordance with the invention.

FIG. 12 illustrates an embodiment of an infrared image representing the subtraction of the ambient temperature profile from the measured temperature profile in function of position of the ambient temperature over time (of FIG. 11), in accordance with the invention, and herewith referring to the formula $E_{object}(x,y,t)=E(x,y,t)-E_{ambient}(t)$ of the modelation as earlier described. The natural day and night cycles being position independent are compensated such that only position depending disturbances are remained. These disturbances are physically modelled, such that they can be filtered out by subtraction. Examples of the position depending disturbances are for instance direct sunlight after a cloudy period, causing a direct increase in measured T(x,y, t), followed by an increase due to warming up of the material. The speed and amount of warming up is material, and thus also position dependent, but representing similar curves. By means of modelling this type of disturbance can be filtered out. Another example is reflection of the sun on a metal having a fixed position in the image. Depending on the angle of incidence relative the sun and the reflection towards the camera, a temperature peak will occur because of the sun (=irradiation source) relatively moving in time, reaching a maximum when the sun is directly mirrored in the camera. Before and after this maximum, local smaller maxima and minima can be measured, i.e. rather as a sinusoidal pattern instead of a linear progress. Further examples are movement of a vehicle, delivering an immediate disturbance. A stationary vehicle, i.e. a vehicle driving over the pixel, may also disturb, and e.g. for a while staying on the spot at the position of the pixel with a hot (all or not driving) engine. Rain represents a comparable pattern to direct sunlight, be it rather the inverse and thus a strong decrease in temperature.

Figure 13:
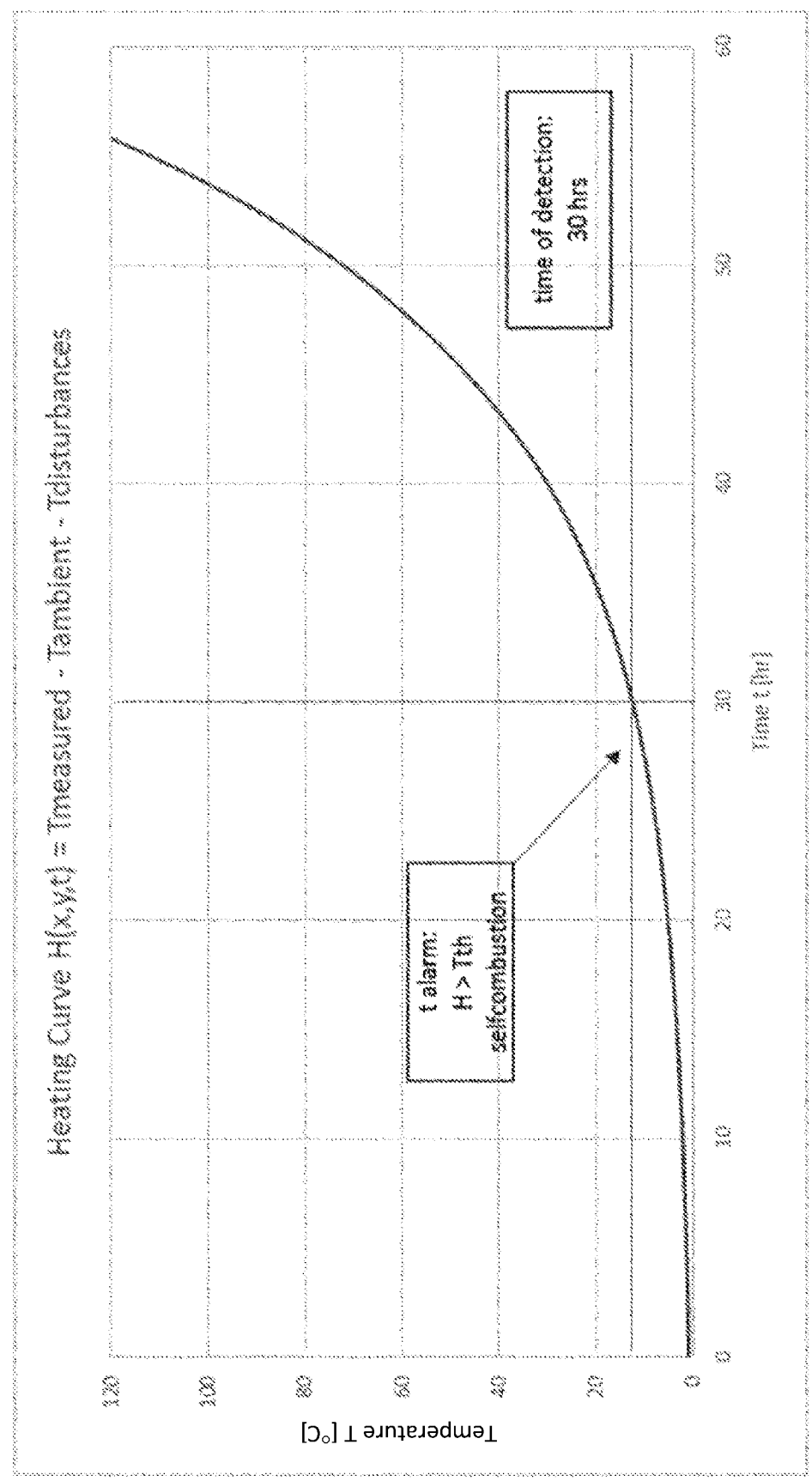
FIG. 13 illustrates an embodiment of a heating image representing measured temperature profile, subtracted with temperature profile of ambient environment and subtracted with temperature profile of disturbances, in accordance with the invention.

FIG. 13 illustrates an embodiment of a heating curve or heating image defined as the measured temperature profile T(x,y,t), subtracted with temperature profile of ambient environment Tambient(t) and subtracted with temperature profile of disturbances Tdisturbance(x,y,t), in accordance with the invention. The heating curve is considered as the result we are aiming at with respect to systems and methods of the invention. After filtering of disturbances, the active warming up or heating of an object or material itself at pixel position (x,y) can be measured. An example is given for a pixel, wherein clearly self-combustion activity is observed. The increase of temperature within this curve is excluded and/or independent from all external influences. Whenever a value on this curve is above zero, it means that the material itself on this pixel is generating a temperature increase, apart from external influences. Based on the evolution of this temperature increase, the temperature profile can be checked and compared with known, typical temperature curves due to heating, and hence define whether or not this pixel is subject to heating activity. Based on physical modelling of heating, and filtering of raw input data towards a heating curve free from external influences or disturbances, detection can be much faster. The threshold for warming up is depending on the material, and is much smaller than the range of 70° C. referred to in the raw data. There are no longer false notifications due to disturbing factors caused by weather conditions. In FIG. 13 is clearly shown that, based on the method (subtracting external influences and disturbances) in accordance with the present invention, heating alarm is detected after 30 hours, instead of 49 hours while referring to the measured temperature profile still including disturbances and external influences and as illustrated in FIG. 11. In other words, in this particular example, heating is detected 19 hours earlier with the present invention method instead of using a conventional method. The advantage and importance of the new method for detecting heating herewith becomes clear. Earlier detection of heating, means that it is much more likely to prevent or avoid fire. For instance at this early phase simple actions may be taken such as pulling open the heap of material where heating is early detected, in order to avoid dramatic consequences. More in particular, at this early time, the heap is still warming up, but internally not yet ready for catching fire. Using conventional methods wherein detection is at 70° C., three quarters of the material is already burnt when the alarm is given, and only a few hours are left from a raging fire.

According to an embodiment, detection is not only based on the heating image, but also on the first and respectively second derivative of the heating image.

According to an embodiment, the spatial aspect of heating activity can also be modelled, for use within the detection method.

Figure 14:
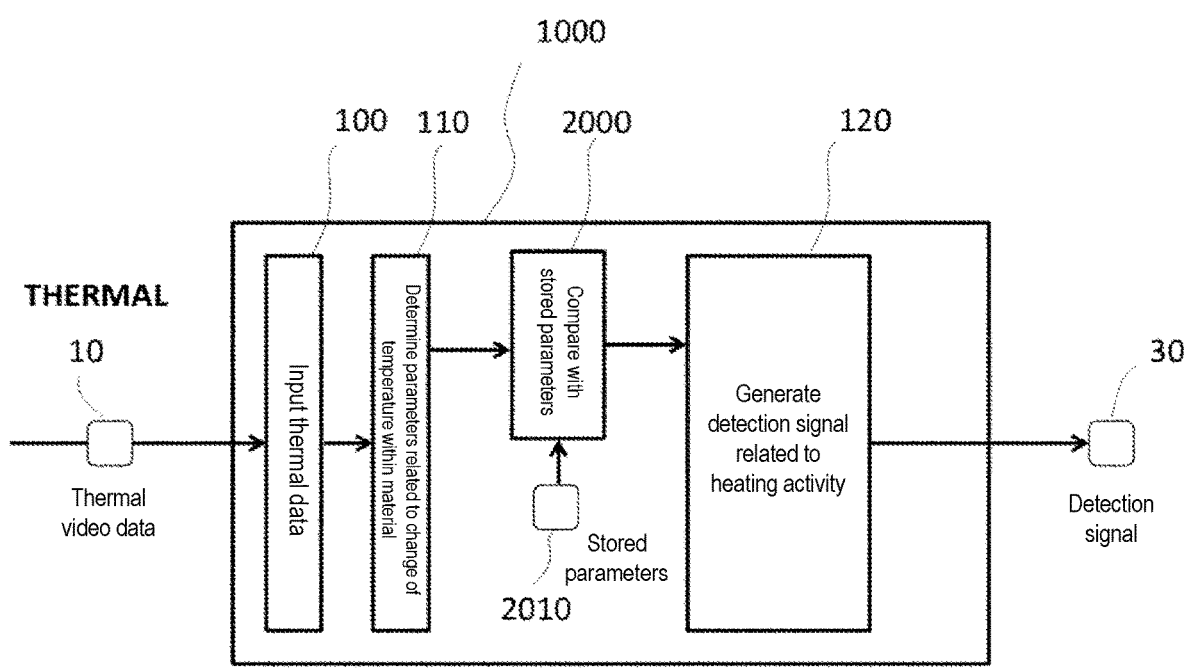
FIG. 14 illustrates an exemplary embodiment of the method of FIG. 1.
Figure 15:
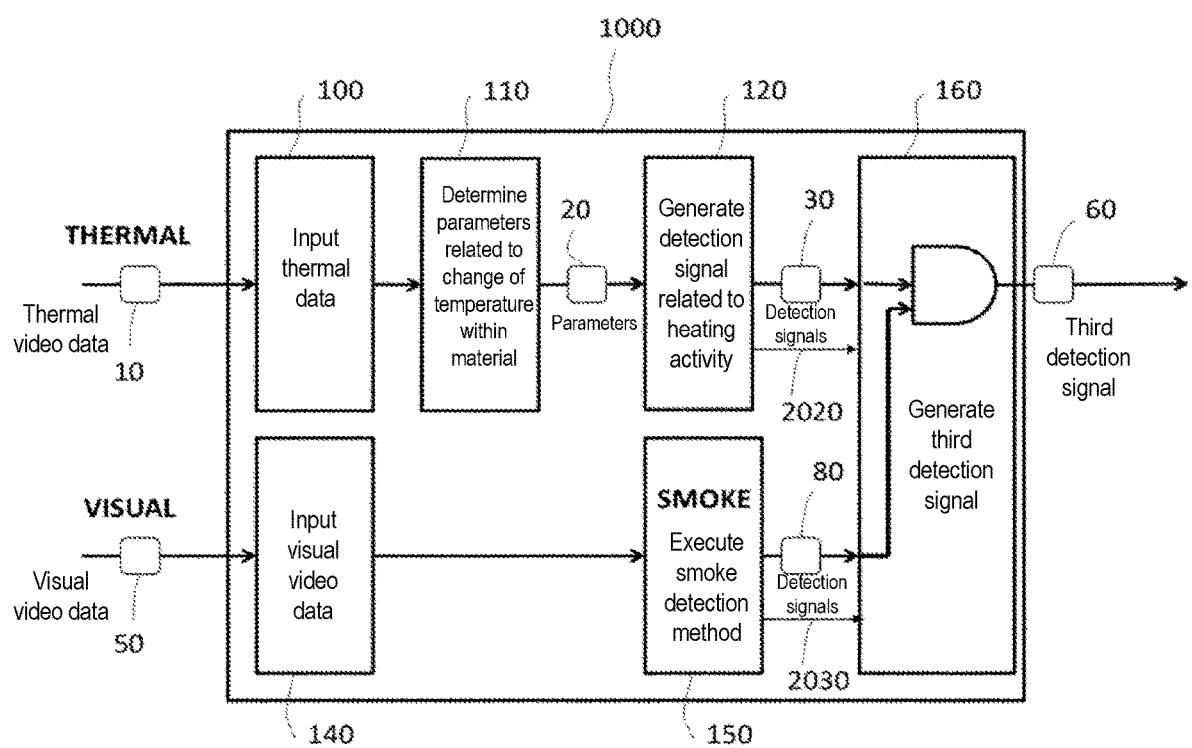
FIG. 15 illustrates an exemplary embodiment of the method of FIG. 4.

In FIG. 14 an exemplary embodiment of the method of FIG. 1 is shown. In particular it is shown that the parameters determined in step 110 are compared in the compare step 2000 with stored parameters 2010. This comparison (indicating whether such determined parameters realistically relate to said heating activity) is used for generating a detection signal 30 related to heating activity in the material, as a third step 120 of the method 1000. For sake of completeness (but not shown in FIG. 9), the above procedure of parameter determination and compare can be applied mutatis mutandis to the additional step 300 of FIG. 9. As the additional step 300 is intended for determining one or more estimates 310 of temperature influences around or in the material for which heating activity is detected, again therefore again parameters are determined related to change of temperature within said material based on said inputted first video data 10 but now related to the temperature influence under investigation and thereafter such determined parameters are to be compared with stored parameters to determine whether such determined parameters are plausible related to said temperature influences.

The invention claimed is:

1. A method for detection of a heating activity in a material, wherein the heating activity is due to self-combustion within the material, the method comprising:
  (a) inputting first video data of a monitored field of view, covering the environment of the material, comprising a plurality of image frames containing thermal data;
  (b) determining by model fitting, from the thermal data in the plurality of image frames, parameters related to change of temperature within the material over time; and
  (c) comparing the parameters determined in (b) related to change of temperature within the material over time with expected parameters for the heating activity due to self-combustion within the material over time, to determine based on a physics-based model representative of underlying heating phenomena within the material whether the parameters determined in (b) related to change of temperature within the material over time indicate that the heating activity are due to self-combustion within the material, then generating a first detection signal related to heating activity in the material, the generation of the first detection signal being based on a determination whether the parameters determined in (b) indicate occurrence of self-combustion within the material.

2. The method of claim 1, further comprising:
  (d) determining, by model fitting from the inputted first video data, one or more estimates of temperature influences around or in the material based on a physics-based model representative of related heating phenomena within the material, then comparing the one or more estimates with stored parameters regarding the temperature influences to determine a plausibility of whether the parameters determined in (b) pertaining to change of temperature within the material over time are related to the related heating phenomena,
wherein (b) is performed on the inputted first video data adapted to, corrected for, or compensated for the estimates of temperature influences determined in (d).

3. The method of claim 1, further comprising:
  (d) determining an estimate of the ambient temperature around the material based on the inputted first video data or based on inputted ambient temperature,
wherein (b) is performed on the inputted first video data adapted for the ambient temperature estimate determined in (d).

4. The method of claim 1, further comprising:
  (e) inputting second video data of a monitored field of view, covering the environment of the material, comprising a plurality of image frames related to visual data;
  (f) executing a smoke detection method and generating a second detection signal related in heating activity in the material based on the inputted second video data related to visual data; and
  (g) generating a third detection signal related in heating activity in the material based on logically combining the first and second detection signal.

5. The method of claim 1, further comprising:
  (e) inputting second video data, of a monitored field of view, covering the environment of the material, comprising a plurality of image frames related to visual data,
wherein (b) is performed on a portion of the inputted first video data, the portion being determined based on the inputted second video data related to visual data.

6. The method of claim 4, wherein (f) is performed on a portion of the inputted second video data related to visual data, the portion being determined based on the parameters determined in (b) related to change of temperature.

7. The method of claim 4, wherein for one or more of (a), (b), (c), (d), (e), (f), and (g), the first inputted video data is subjected to a nonlinear scaling caused by categorization.

8. A system suitable for detecting heating activity in a material, wherein the heating activity is due to self-combustion within the material, the system comprising:
  (i) first sensors for inputting video data, of a monitored field of view, covering the environment of the material comprising a plurality of image frames containing thermal data; and
  (ii) a computing device, coupled to the first sensors and being adapted for:
    (b) determining by model fitting, from the thermal data in the plurality of image frames, parameters related to change of temperature within the material over time; and
    (c) comparing the parameters determined in (b) as related to change of temperature within the material over time with expected parameters for the heating activity due to self-combustion within the material over time, to determine based on a physics-based model representative of underlying heating phenomena within the material whether the parameters determined in (b) related to change of temperature within the material over time relate to the heating activity due to self-combustion within the material, then generating a first detection signal related to heating activity in the material, the generation of the first detection signal being based on the determination whether the parameters determined in (b) relate to the heating activity.

9. The system of claim 8, wherein the computing device is further adapted for:
   (d) determining an estimate of the ambient temperature around the material based on the inputted first video data or based on inputted ambient temperature.

10. The system of claim 8, wherein the first sensors are based on an array of IR thermopiles and/or bolometers.

11. The system of claim 8, further comprising:
   (iii) second sensors coupled to the computing device and being adapted for:
      (e) inputting video data, of a monitored field of view, covering the environment of the material, comprising a plurality of image frames related to visual data,
      (f) generating a second detection signal related in heating activity in the material based on the inputted second video data related to visual data; and
      (g) generating a third detection signal related in heating activity in the material based on logically combining the first and second detection signal.

12. The system of claim 8, further comprising:
   (iii) means for inputting the ambient temperature, the means being coupled to the computing device.

\* \* \* \* \*